United States Patent
Vajravel et al.

(10) Patent No.: US 12,511,371 B2
(45) Date of Patent: Dec. 30, 2025

(54) ADAPTIVE DISPLAY ASSOCIATION AND PLACEMENT FOR SECURE WORKSPACES IN A MULTI-DISPLAY ENVIRONMENT

(71) Applicant: Dell Products L.P., Round Rock, TX (US)

(72) Inventors: Gokul Thiruchengode Vajravel, Bangalore (IN); Vivekanandh Narayanasamy Rajagopalan, Bangalore (IN); Srinivasa Ragavan Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 468 days.

(21) Appl. No.: 18/051,651

(22) Filed: Nov. 1, 2022

(65) Prior Publication Data
US 2024/0143736 A1   May 2, 2024

(51) Int. Cl.
*G06F 21/53*   (2013.01)

(52) U.S. Cl.
CPC ........ *G06F 21/53* (2013.01); *G06F 2221/034* (2013.01)

(58) Field of Classification Search
CPC ..................................................... G06F 21/53
See application file for complete search history.

(56) References Cited

U.S. PATENT DOCUMENTS

| | | | |
|---|---|---|---|
| 2007/0285408 A1* | 12/2007 | Adams | G09G 5/14 345/204 |
| 2011/0239142 A1* | 9/2011 | Steeves | G06F 3/14 345/3.1 |
| 2012/0084798 A1* | 4/2012 | Reeves | G06F 9/542 719/319 |
| 2012/0327061 A1* | 12/2012 | Sirpal | G06F 3/0483 345/211 |
| 2013/0002524 A1* | 1/2013 | Sirpal | G06F 1/1616 345/1.3 |
| 2013/0100001 A1* | 4/2013 | Reeves | G09G 1/00 345/1.3 |
| 2014/0184471 A1* | 7/2014 | Martynov | G06F 21/6209 345/1.2 |
| 2019/0042066 A1* | 2/2019 | Kim | H04M 1/725 |
| 2023/0065950 A1* | 3/2023 | Boyapalle | G06F 9/45541 |
| 2024/0143780 A1* | 5/2024 | Rajagopalan | G06F 21/577 |
| 2024/0152639 A1* | 5/2024 | Vajravel | G06F 21/53 |

* cited by examiner

Primary Examiner — Simon P Kanaan
(74) Attorney, Agent, or Firm — Brian Tucker; Kirton McConkie

(57) ABSTRACT

Adaptive display association and placement for secure workspaces in a multi-display environment is provided. A secure workspace display manager can be configured to detect displays available on a user computing device and, in conjunction with a host agent, identify applications that are running inside secure workspaces deployed on the user computing device. The secure workspace display manager can use characteristics of the available displays and an application type of the applications running in the secure workspaces to create application-to-display mappings that will maximize the user experience in the multi-display environment. The secure workspace display manager can then move windows of the applications in accordance with the application-to-display mappings.

19 Claims, 10 Drawing Sheets

Display Data Structure 201

| Display ID | Model Name | Model Number | Manufacturer | Characteristics |
|---|---|---|---|---|
| DisplayID1 | Dell UltraSharp 43 4K USB-C Monitor | U4320Q | Dell | Screen Size = 42.5"<br>Resolution = 3840x2160<br>Color Support = 1.07 billion<br>Contrast Ratio = 1000:1<br>Orientation = landscape<br>... |
| DisplayID2 | Dell 32 Curved Gaming Monitor | S3222DGM | Dell | Screen Size = 31.5"<br>Resolution = 2560x1440<br>Color Support = 16.8 million<br>Contrast Ratio = 3000:1<br>Orientation = landscape<br>... |
| DisplayID3 | Dell UltraSharp 27 Monitor | U2722D | Dell | Screen Size = 27"<br>Resolution = 2560x1440<br>Color Support = 1.07 million<br>Contrast Ratio = 1000:1<br>Orientation = portrait<br>... |
| ... | | | | |

FIG. 2A

| Secure Workspace Data Structure 202 | | | |
|---|---|---|---|
| Secure Workspace ID | Application ID | Application Name | Application Type |
| SWID1 | AppID1 | Counter Strike Global Offensive | Gaming |
| SWID2 | AppID2 | PowerPoint | Productivity |
| SWID3 | AppID3 | Word | Productivity |
| SWID4 | AppID4 | Zoom | Collaboration |
| ... | | | |

| Application-to-Display Mappings Data Structure 203 | |
|---|---|
| Application ID | Display ID |
| AppID1 | DisplayID2 |
| AppID2 | DisplayID1 |
| AppID3 | DisplayID3 |
| AppID4 | DisplayID1 |
| ... | |

FIG. 2B

ADAPTIVE DISPLAY ASSOCIATION AND PLACEMENT FOR SECURE WORKSPACES IN A MULTI-DISPLAY ENVIRONMENT

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine or a software-based container. An application hosted in a secure workspace will be isolated from resources in the external environment and from other applications or services hosted external to the secure workspace, including native applications and applications hosted in other secure workspaces.

Users oftentimes connect their user computing devices to multiple displays thereby creating a multi-display environment. When working in a multi-display environment, users usually place applications (or more specifically, the applications' windows) on a particular display. This is typically a manual process and may involve trial and error as the user attempts to match each application to the most suitable display. For example, a user may simultaneously use multiple applications where one application is best displayed on a display with a higher resolution, a particular orientation, etc. and another application is best displayed on a display with other characteristics.

Although some solutions exist for assisting the user is placing applications on particular displays, such solutions do not work when applications are hosted in secure workspaces. For example, the operating system or other solution will be able to detect the secure workspaces but will not know what application(s) are running inside the secure workspaces. Additionally, many solutions that leverage secure workspaces to host applications are configured to migrate applications between different types of secure workspaces. Such migrations further complicate any efforts to associate an application hosted in a secure workspace with a particular display. Therefore, a user must rely on manual techniques to arrange applications hosted in secure workspaces on the displays available in a given multi-display environment.

BRIEF SUMMARY

The present invention extends to systems, methods and computer program products for adaptive display association and placement for secure workspaces in a multi-display environment. A secure workspace display manager can be configured to detect displays available on a user computing device and, in conjunction with a host agent, identify applications that are running inside secure workspaces deployed on the user computing device. The secure workspace display manager can use characteristics of the available displays and an application type of the applications running in the secure workspaces to create application-to-display mappings that will maximize the user experience in the multi-display environment. The secure workspace display manager can then move windows of the applications in accordance with the application-to-display mappings.

In some embodiments, the present invention may be implemented as a method for adaptive display and placement for secure workspaces in a multi-display environment. Displays that are available to a user computing device can be identified. Applications that are hosted in secure workspaces on the user computing device can also be identified. Application-to-display mappings for the applications that are hosted in the secure workspaces can be created. Windows pertaining to the secure workspaces in which the applications are presented can be identified. The windows can then be positioned on the displays based on the application-to-display mappings.

In some embodiments, the present invention may be implemented as computer storage media storing computer executable instructions which when executed implement a method for adaptive display and placement for secure workspaces in a multi-display environment. Characteristics of displays that are available to a user computing device can be identified. Applications that are hosted in secure workspaces on the user computing device can be identified. Application-to-display mappings for the applications that are hosted in the secure workspaces can be created based on application types of the applications and the characteristics of the displays. Windows pertaining to the secure workspaces in which the applications are presented can be identified. The windows can be positioned on the displays based on the application-to-display mappings.

In some embodiments, the present invention may be implemented as a user computing device that includes one or more processors and computer storage media storing computer executable instructions which when executed implement a method for adaptive display and placement for secure workspaces in a multi-display environment. Characteristics of displays can be identified. Applications that are running inside secure workspaces can be identified. Application-to-display mappings for the applications can be created based on application types of the applications and the characteristics of the displays. Windows pertaining to the secure workspaces in which the applications are presented can be identified. The windows can be positioned on the displays based on the application-to-display mappings.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 2A and 2B provide examples of data structures that may be used in one or more embodiments of the present invention;

DETAILED DESCRIPTION

Figure 1:
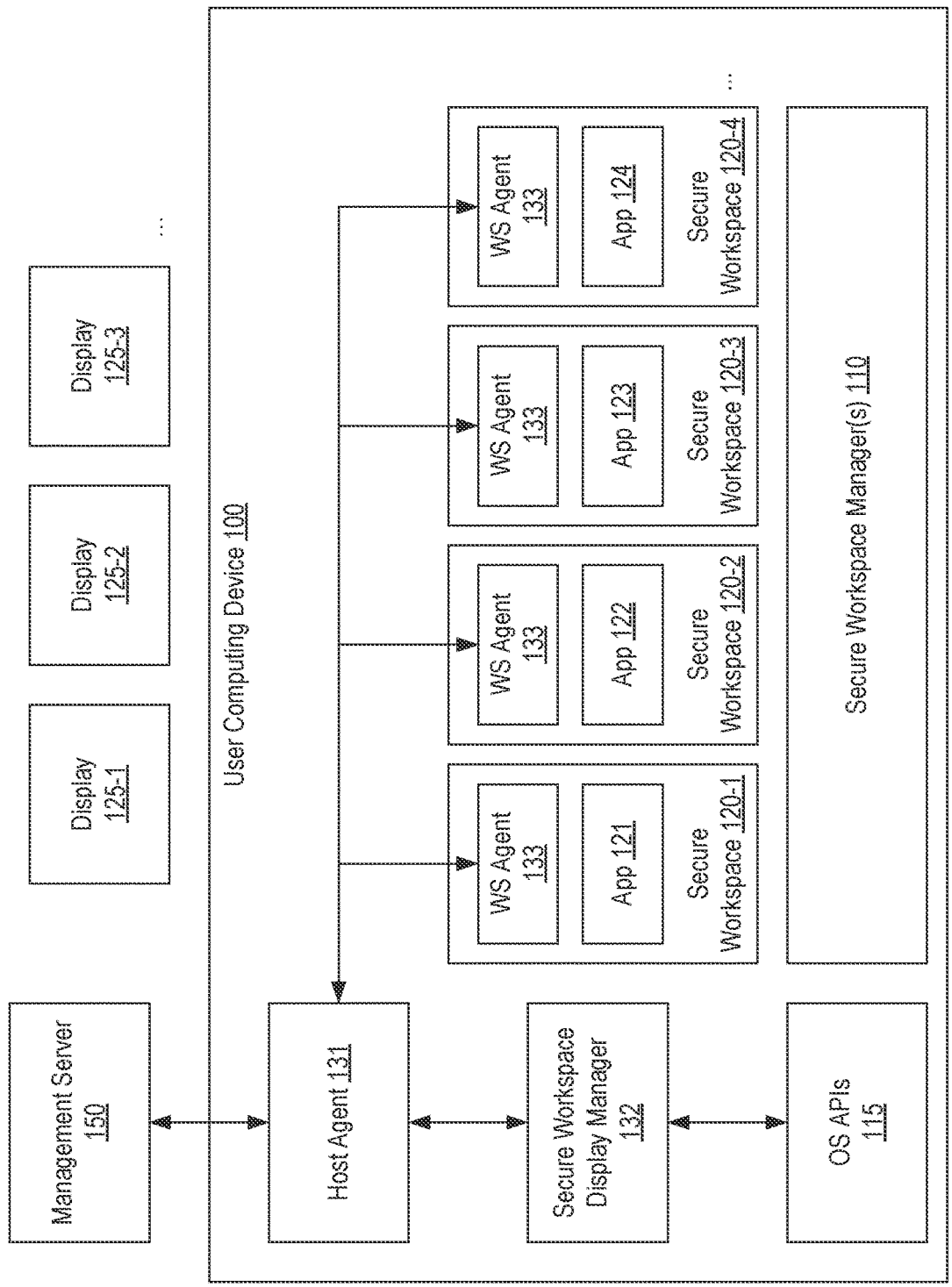
FIG. 1 provides an example of a computing environment in which embodiments of the present invention may be implemented.

FIG. 1 provides an example of a computing environment in which one or more embodiments of the present invention may be implemented. This computing environment includes a user computing device 100 and a management server 150 which is used to manage user computing device 100. Although only a single user computing device 100 is shown, management server 150 would typically be used to manage a large number of user computing devices, any or all of which could be configured in the same manner as user computing device 100 to thereby allow adaptive display association and placement for secure workspaces in a multi-display environment in accordance with embodiments of the present invention.

User computing device 100 is shown as having one or more secure workspace managers 110. A secure workspace manager is intended to represent the components on user computing device 100 that allow secure workspaces to be deployed. For example, a secure workspace manager may be a hypervisor (e.g., Hyper-V) when virtual machines are used to implement secure workspaces, a container daemon when containers (e.g., Docker containers) are used to implement secure workspaces, a sandbox manager when sandboxes (e.g., Sandboxie isolated environments) are used to implement secure workspaces, a Webapp manager when a browser sandbox is used to implement secure workspaces, etc. In the depicted example, it is assumed that four secure workspaces 120-1 through 120-4 are deployed on user computing device 100. However, there could be any number and/or type of secure workspaces at any given time. These secure workspaces are represented as hosting applications 121, 122, 123, and 124 respectively. Notably, a secure workspace could include more than one application.

User computing device 100 is also shown as having a host agent 131. Host agent 131 can be configured to implement management services on user computing device 100 including the deployment and management of secure workspaces on user computing device 100. For example, management server 150 may interface with host agent 131 to provide secure workspaces (or at least information for creating secure workspaces), and host agent 131 may interface with secure workspace manager(s) 110 to create and manage the secure workspaces.

Each secure workspace can include a workspace agent 133 that is configured to interface with host agent 131 to implement adaptive display association and placement for secure workspaces in a multi-display environment in accordance with embodiments of the present invention. A secure workspace display manager 132 may also be deployed on user computing device 100 and may be configured to interface with host agent 131 to implement adaptive display association and placement for secure workspaces in a multi-display environment in accordance with embodiments of the present invention. In some embodiments, secure workspace display manager 132 may leverage operating system (OS) APIs 115 to associate a secure workspace with a particular display.

User computing device 100 may include a built-in display and/or may be connected to any number of external displays to create a multi-display environment in which embodiments of the present invention may be implemented. FIG. 1 therefore includes display 125-1, display 125-2, and display 125-3 as one example only of a multi-display environment in which embodiments of the present invention may be implemented.

FIGS. 2A and 2B provide examples of various data structures that may be maintained in one or more embodiments of the present invention. FIG. 2A provides an example of a display data structure 201 that secure workspace display manager 132 may create and update to identify each display that is available on/to user computing device 100 and characteristics of such displays. Display data structure 201 includes entries for three displays which will be assumed to represent displays 125-1, 125-2, and 125-3 in the examples below. In some embodiments, an entry in display data structure 201 may include a unique identifier for the display, a model name, model number, and manufacturer of the display, and characteristics of the display that may be used by secure workspace display manager 132 to implement adaptive display association and placement for secure workspaces in a multi-display environment in accordance with embodiments of the present invention. For example, these characteristics could include a screen size, a resolution, a refresh rate, color support, contract ratio, an orientation, pixel pitch, brightness, a position relative to the user computing device or other display(s), whether the display has a webcam, etc.

FIG. 2B provides an example of a secure workspace data structure 202 that secure workspace display manager 132 can create and update to identify applications that are running in secure workspaces on user computing device 100. In some embodiments, each entry in secure workspace data structure 202 can include an identifier of a secure workspace and an identifier, name, and type of an application running in that secure workspace. For example, secure workspace data structure 202 includes entries for four applications which will be assumed to be applications 121, 122, 123, and 124 running in secure workspaces 120-1, 120-2, 120-3, and 120-4 respectively.

FIG. 2B also provides an example of an application-to-display mappings data structure 203. Secure workspace display manager 132 may create and update application-to-display mappings data structure 203 to define mappings between applications that are or may be hosted in a secure workspace and a display that is or may be available on/to user computing device 100. As described in greater detail below, secure workspace display manager 132 may map an application to a display based on a type of the application and characteristics of the available displays.

FIGS. 3A-3D provide an example of how adaptive display association and placement for secure workspaces in a multi-display environment can be implemented in accordance with embodiments of the present invention. This example will be based on the multi-display environment represented in FIG. 1 and the example displays and applications represented in FIGS. 2A and 2B.

Figure 3A:
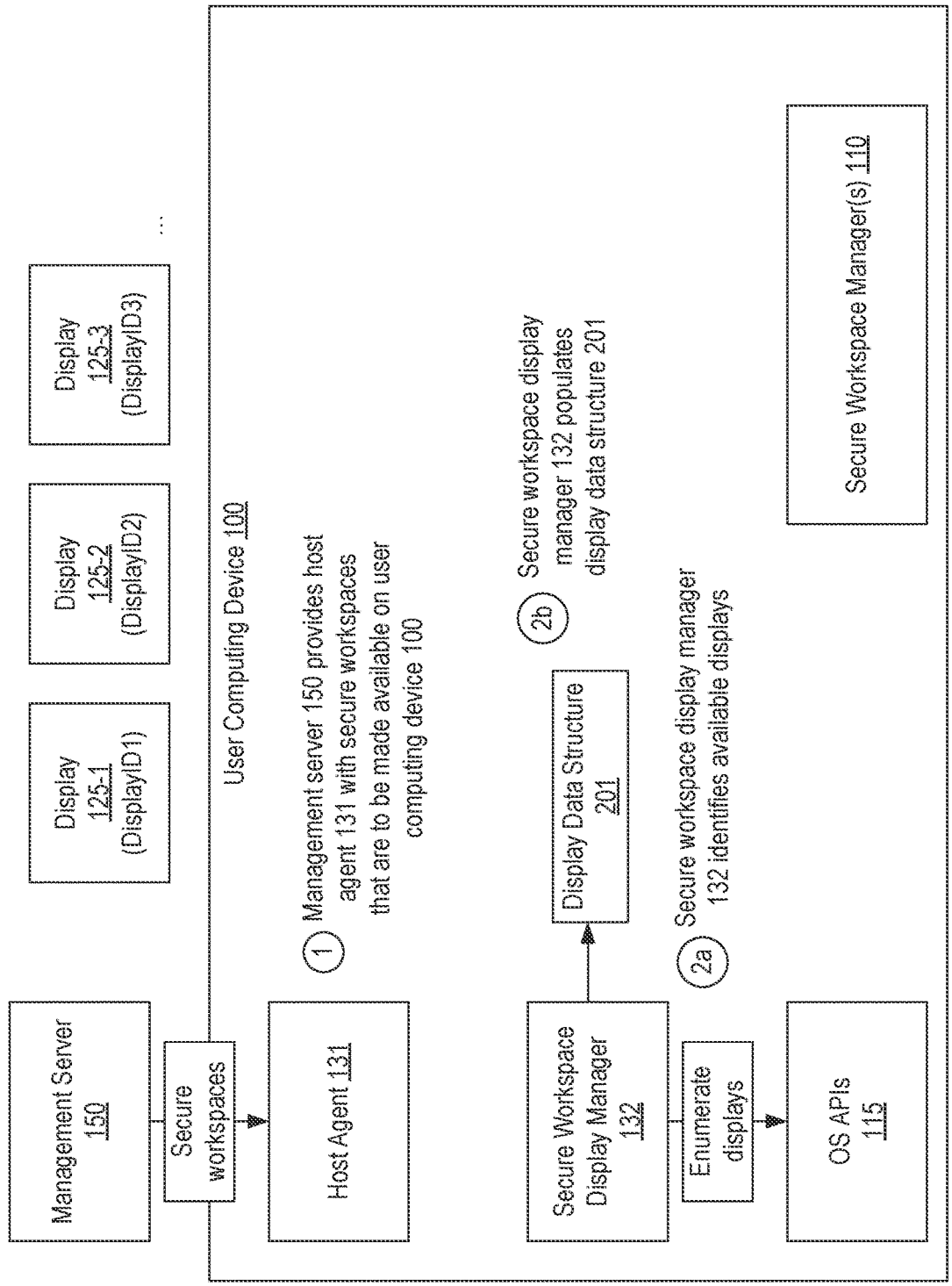
FIGS. 3A-3D provide an example of how adaptive display association and placement for secure workspaces in a multi-display environment may be implemented in accordance with one or more embodiments of the present invention.

Turning to FIG. 3A, it is assumed that user computing device 100 is connected to displays 125-1, 125-2, and 125-3 and that these displays have identifiers of DisplayID1, DisplayID2, and DisplayID3 respectively. It is also assumed that secure workspaces have not yet been deployed on user computing device 100. For example, FIG. 3A could represent the state of user computing device 100 after being connected to a dock and being booted up.

In step 1, it is further assumed that management server 150 provides host agent 131 with the secure workspaces that are to be made available on user computing device 100. For example, after the user logs in, host agent 131 could communicate with management server 150 to obtain/identify any secure workspaces that are associated with the user. In some embodiments, step 1 could entail providing images, layers, etc. from which the secure workspaces may be deployed or could entail identifying images, layers, etc. that may already be stored on user computing device 100 or that may be obtained from some other location.

In step 2a, secure workspace display manager 132 may identify displays that are available on/to user computing device 100. For example, if user computing device 100 is running Windows, secure workspace display manager 132 could call the EnumDisplayDevicesA function to enumerate each display to thereby obtain a name/identifier of each display. Secure workspace display manager 132 could then use the names/identifiers of the displays to obtain their characteristics. Then in step 2b, secure workspace display manager 132 can populate display data structure 201 with the information it obtained. For example, as part of steps 2a and 2b, secure workspace display manager 132 could determine that displays 125-1, 125-2, and 125-3 are available to user computing device 100 and obtain and populate the information shown in display data structure 201 in FIG. 2A. In some embodiments, step 2a may also entail registering to be notified whenever a display is connected to or disconnected from user computing device 100, and in such cases, step 2b can entail updating display data structure 201 in response to being notified of a display connection or disconnection. In other words, secure workspace display manager 132 can be configured to repeatedly determine which displays are available and to update display data structure 201 accordingly.

Figure 3B:
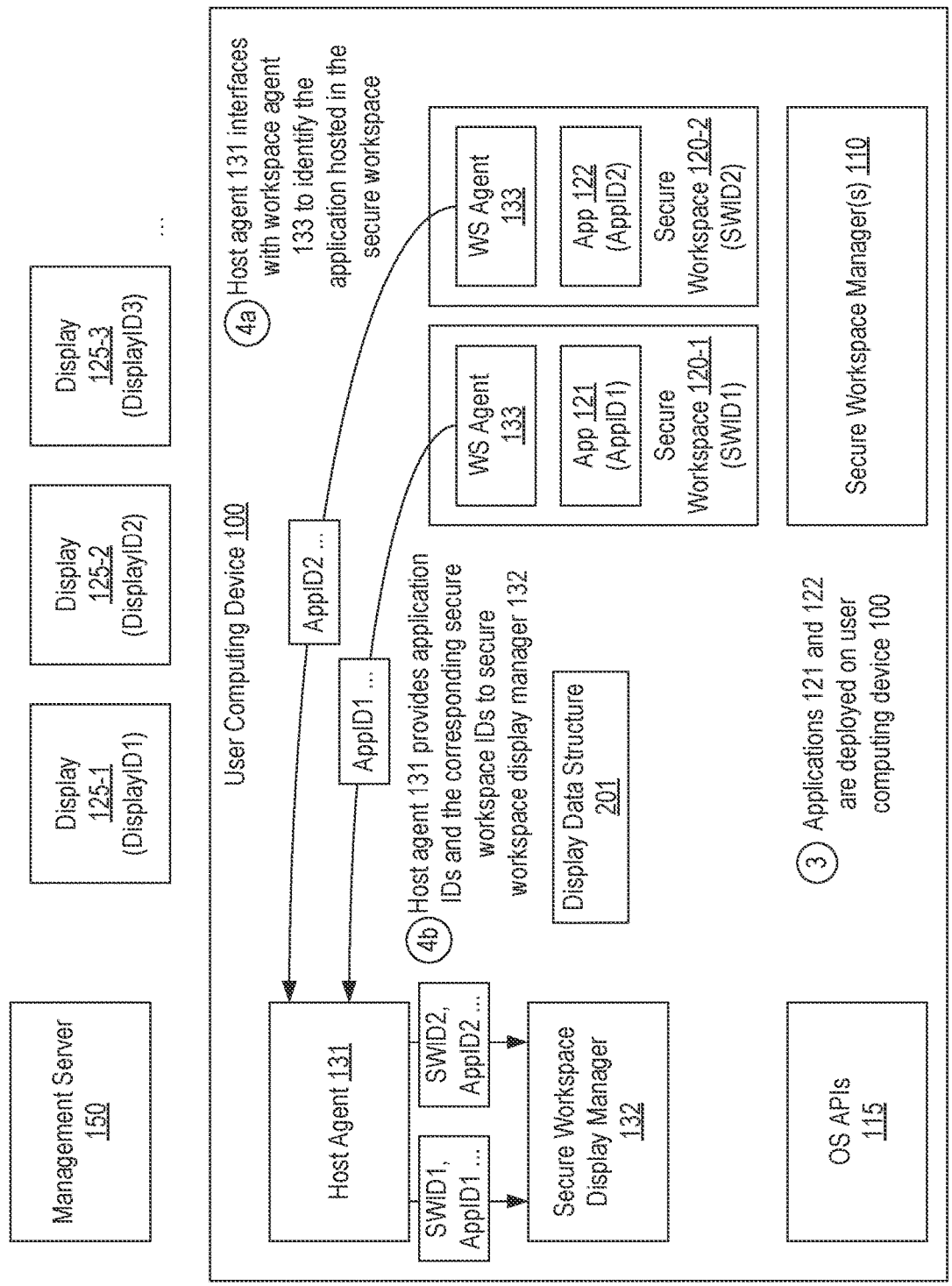

Turning to FIG. 3B, in step 3, it is assumed that application 121 (which can represent the game Counter Strike Global Offensive) and application 122 (which can represent PowerPoint) have been deployed on user computing device 100 within secure workspaces 120-1 and 120-2 respectively. For example, the user could provide input to launch these applications, or the applications could be launched automatically. When secure workspaces 120-1 and 120-2 are deployed to host these applications, an instance of workspace agent 133 will also be hosted within each secure workspace.

In step 4a, host agent 131 can interface with the instance of workspace agent 133 in each of secure workspaces 120-1 and 120-2 to identify that application 121 is running in secure workspace 120-1 and that application 122 is running in secure workspace 120-2. For example, workspace agent 133 could provide an identifier and name of the respective application. Host agent 131 itself will have been able to identify the secure workspace identifiers and can associate the application identifiers and names with the corresponding secure workspace identifiers.

In step 4b, host agent 131 can provide secure workspace display manager 132 with the application IDs and names and corresponding secure workspace IDs. In this example, step 4b would entail informing secure workspace display manager 132 that Counter Strike Global Offensive having an identifier of AppID1 is running in a secure workspace having an identifier of SWID1 and that PowerPoint having an identifier of AppID2 is running in a secure workspace having an identifier of SWID2.

Steps 3, 4a, and 4b can represent repeated and ongoing steps while the user is using user computing device 100. For example, the user may launch applications within secure workspaces at different times. Whenever an application is launched, host agent 131 may interface with the instance of workspace agent 133 executing in the secure workspace in which the newly launched application is running to obtain the application identifier and name. In this way, host agent 131 can ensure that secure workspace display manager 132 is continuously informed of which applications are currently running in which secure workspaces.

Figure 3C:
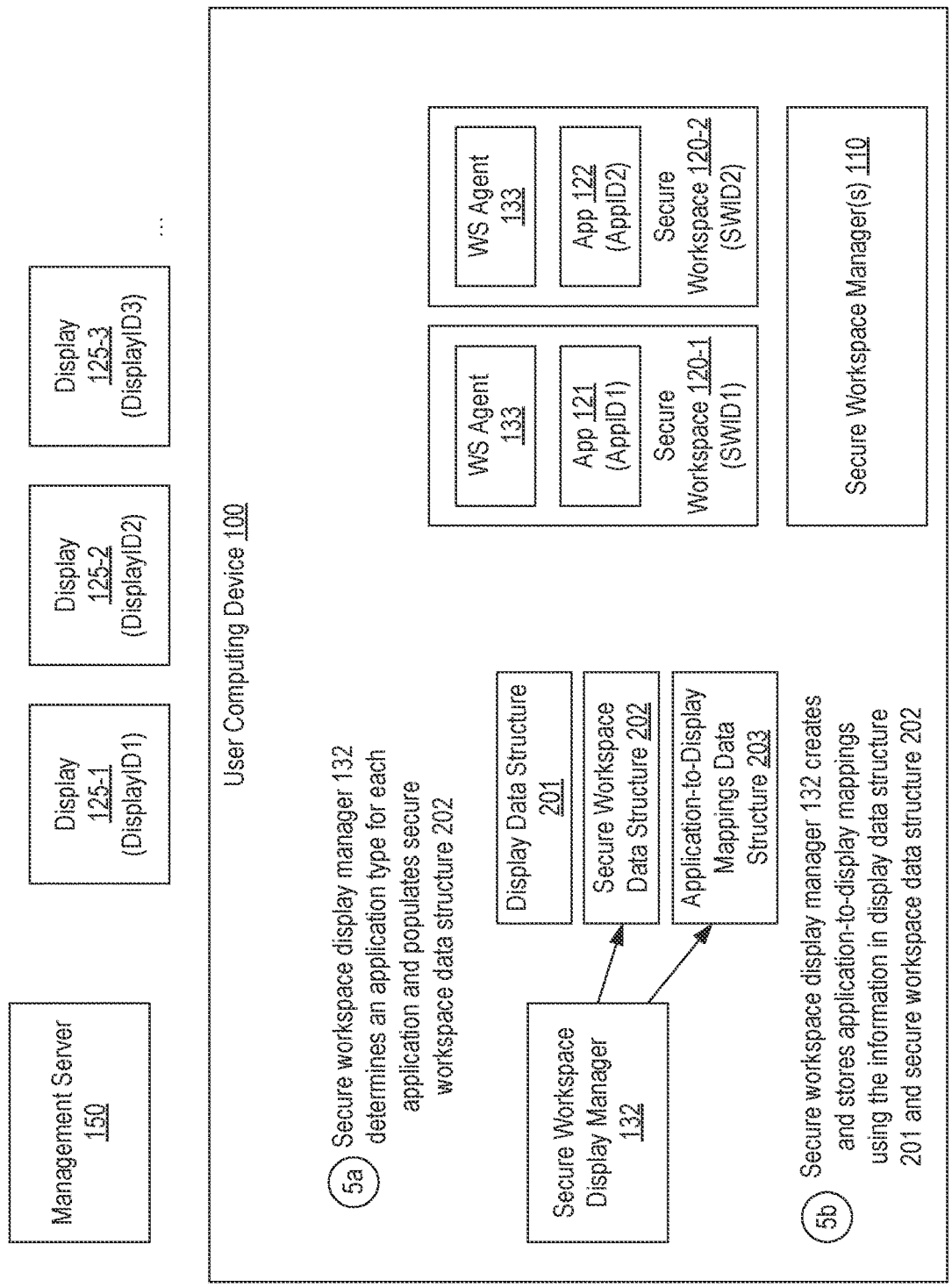

Turning to FIG. 3C, in step 5a, secure workspace display manager 132 can determine an application type for each application and populate secure workspace data structure 202 accordingly. For example, secure workspace display manager 132 may be configured with mappings of application identifiers and/or names to application types. For example, these mappings could associate the identifiers and/or names of various applications with the application type of gaming, productivity, collaboration, etc. Other application types could be used. For example, application types could be defined based on an importance of the applications (e.g., low, medium, and high), based on typical requirements of the applications (e.g., webcam required, high resolution preferred, portrait orientation preferred, etc.), etc.

In step 5b, secure workspace display manager 132 can create application-to-display mappings for each application hosted in a secure workspace based on the application types and the information contained in display data structure 201. Secure workspace display manager 132 may also store these application-to-display mappings in application-to-display mappings data structure 203 so that they may be subsequently used including, in some embodiments, when an application is subsequently run in a secure workspace. In the depicted example, it is assumed that secure workspace display manager maps AppID1 to DisplayID2 and AppID2 to DisplayID1 as reflected in FIG. 2B.

To define such mappings, secure workspace display manager 132 can be configured to identify a most suitable display from among the available displays for each application type. For example, secure workspace display manager 132 may select a display with a high contrast ratio and color support for an application having a gaming application type, a display with a larger size and higher resolution for an application having a productivity application type, and a display with a built-in webcam for an application having a collaboration application type. In short, secure workspace display manager 132 can be configured to map an application to an available display based on any one or combination of the characteristics defined in display data structure 201 for the available displays.

Figure 3D:
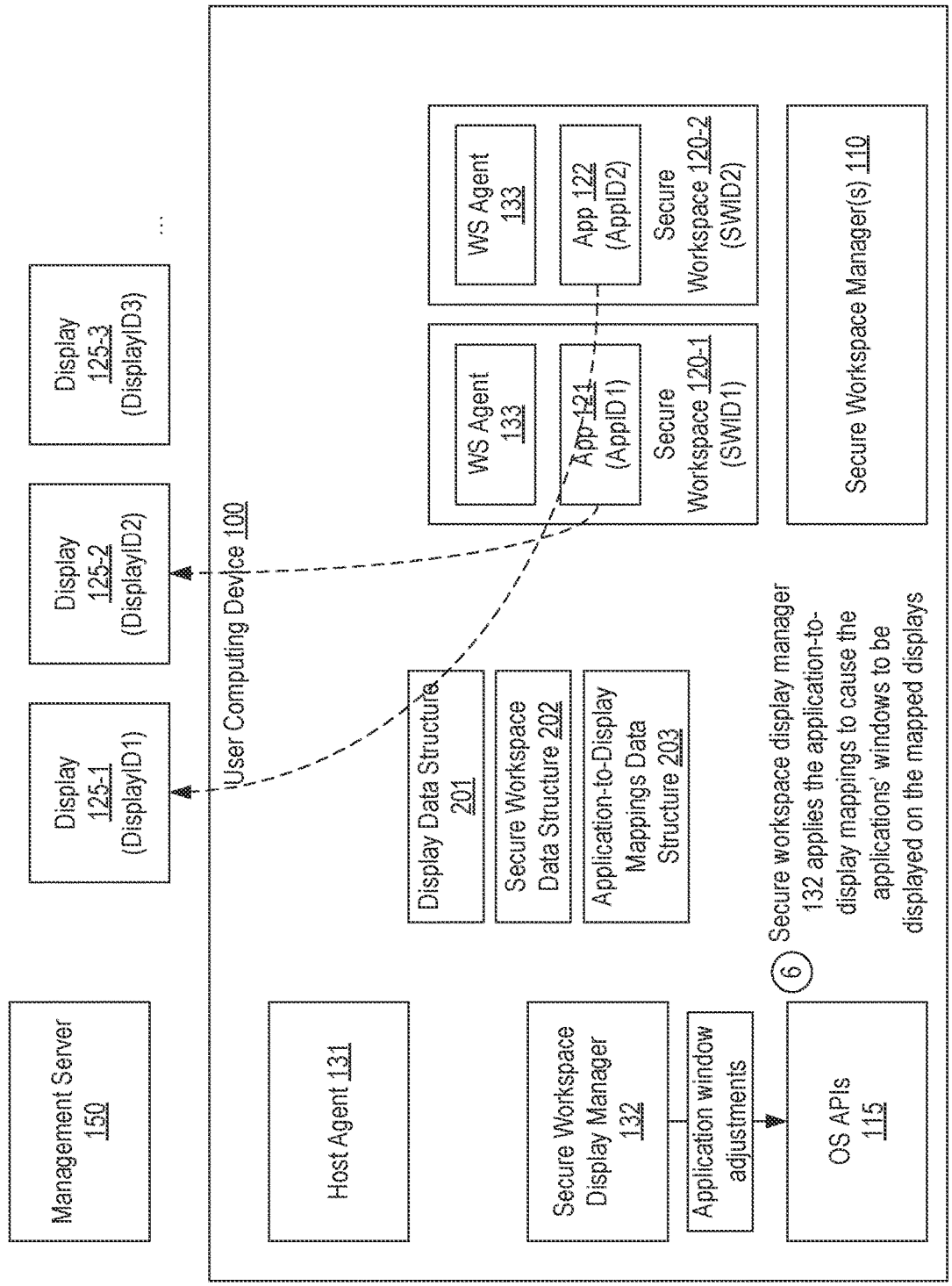

Turning to FIG. 3D, in step 6, secure workspace display manager 132 can use the application-to-display mappings it has determined for applications 121 and 122 to cause their windows to be displayed on the display to which these applications are mapped. Prior to step 6, the windows for these applications could be displayed (or could be configured to be displayed) on any of displays 125-1, 125-2, or 125-3 such as based on a current default window position. To cause the windows to be displayed on the mapped displays, secure workspace display manager 132 may identify which window pertains to which application (e.g., by obtaining the secure workspace ID associated with each window and using secure workspace data structure 202 to identify the associated application ID) and may then determine which display the identified window should be moved to (e.g., using application-to-display mappings data structure 203). Secure workspace display manager 132 can then use OS APIs 115 to move the window for each application to the mapped display (e.g., by calling SetWindowPos in Windows-based implementations).

In this way, secure workspace display manager 132 can ensure that each application hosted in a secure workspace is presented to the user on the most appropriate display. As the user launches different applications and/or as displays are connected to or disconnected from user computing device 100, host agent 131 and secure workspace display manager 132 can perform the above-described functionality to continue this adaptive association and placement of the secure-workspace-hosted applications in the multi-display environment.

Figure 4A:
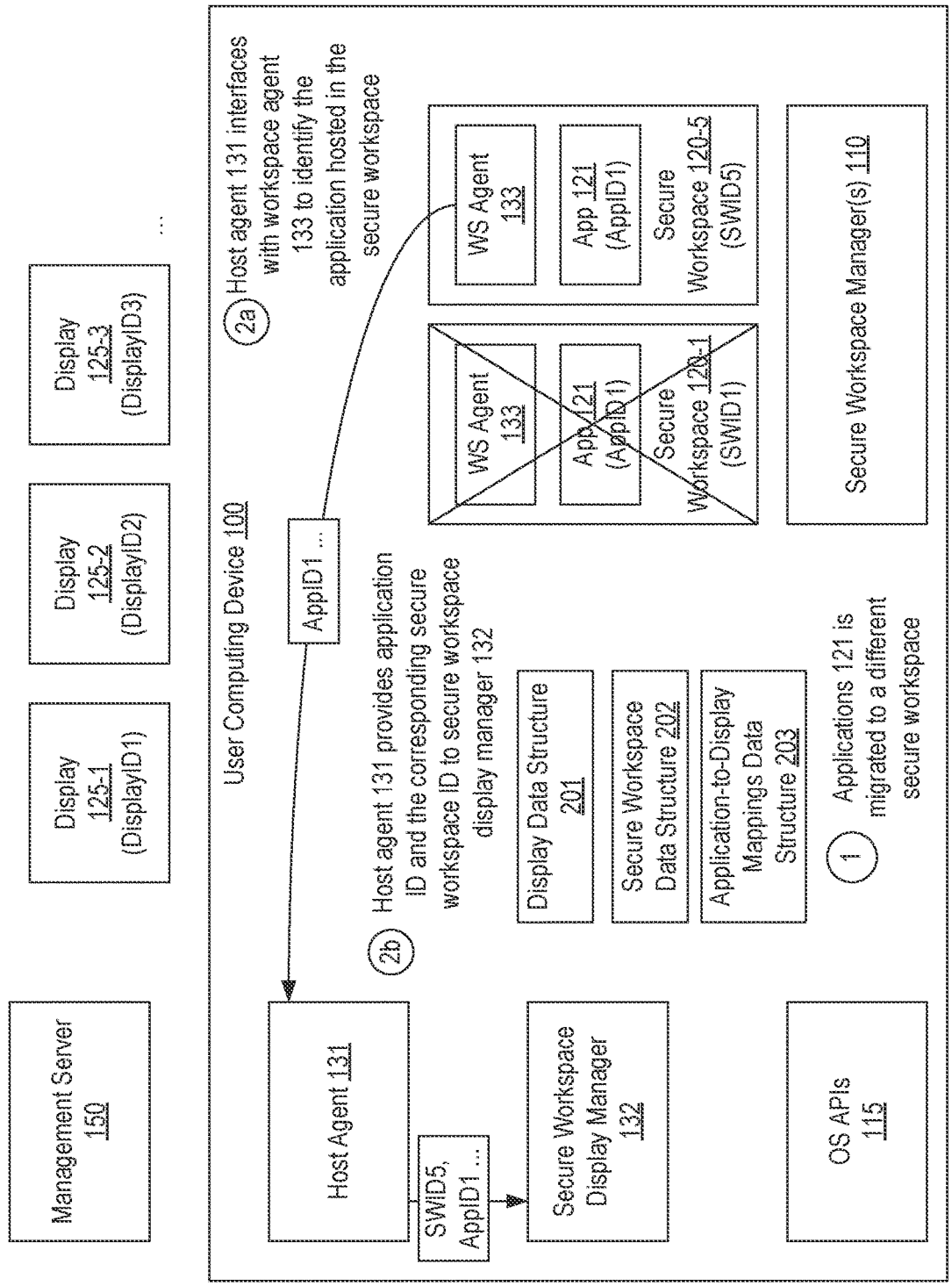
FIGS. 4A-4C provide another example of how adaptive display association and placement for secure workspaces in a multi-display environment may be implemented in accordance with one or more embodiments of the present invention.
Figure 4B:
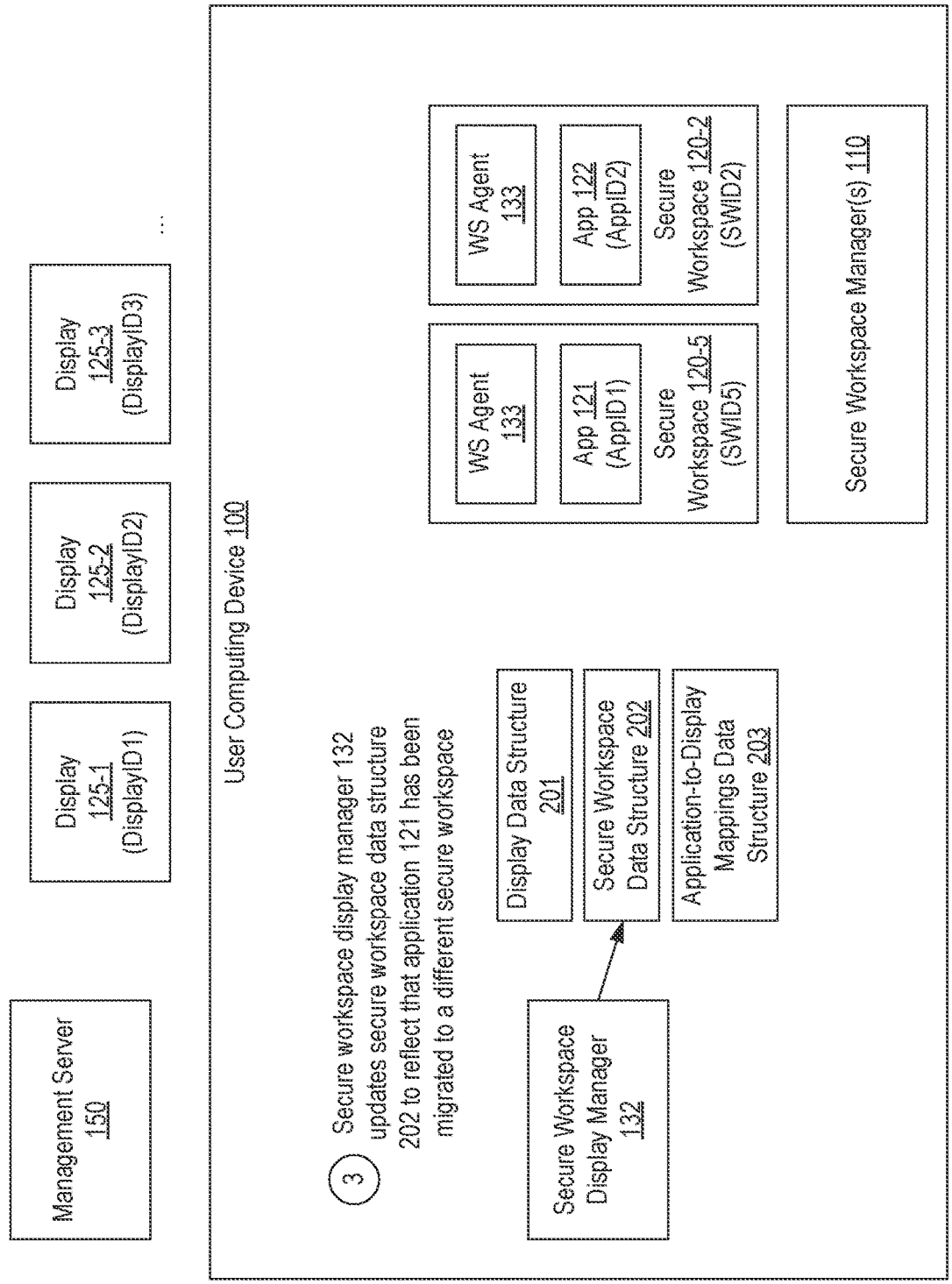
Figure 4C:
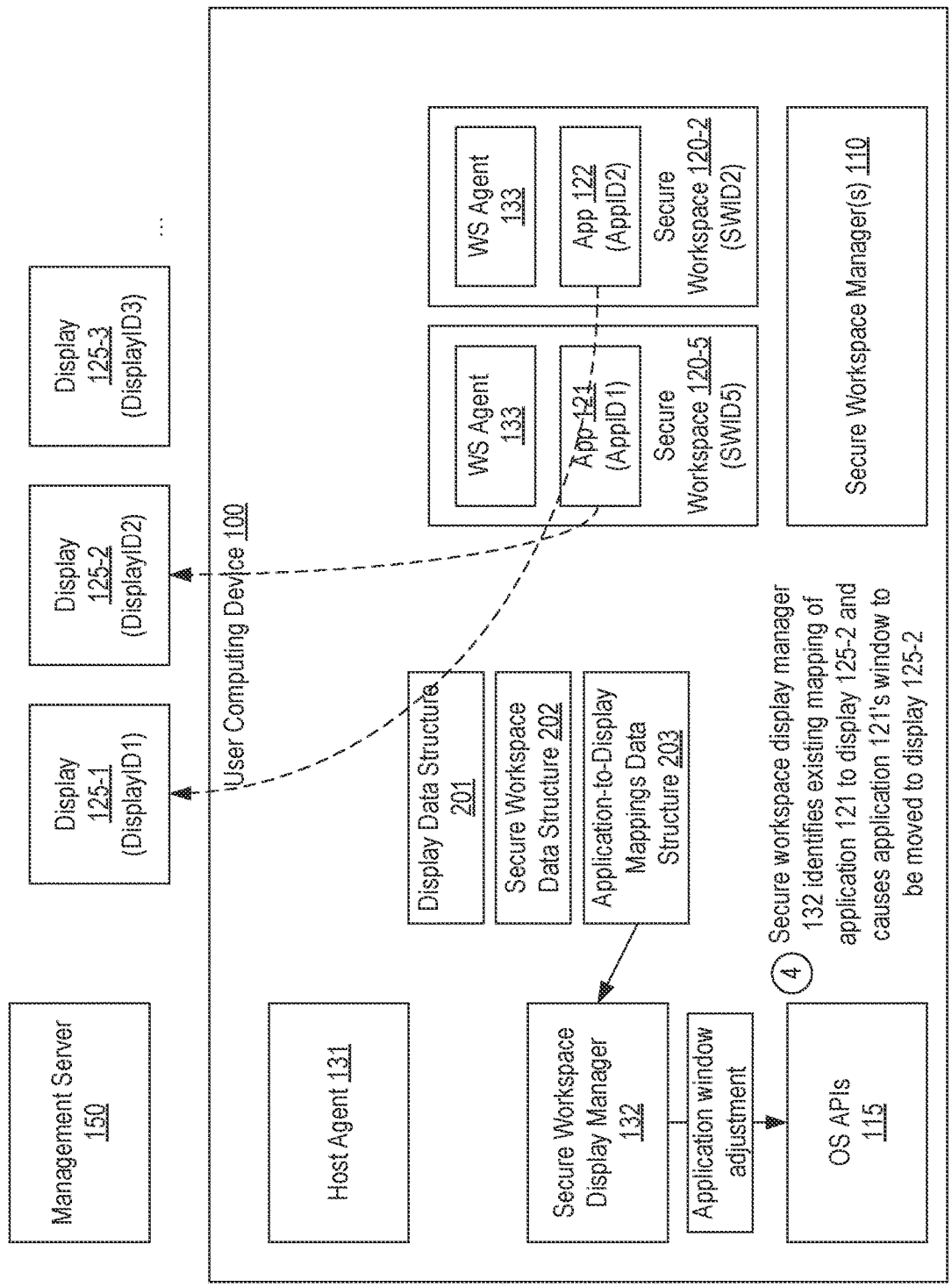

FIGS. 4A-4C provide an example of how secure workspace display manager 132 can maintain an application-to-display mapping even when an application is migrated to a different secure workspace. This example will be based on and continue the example of FIGS. 3A-3D.

Turning to FIG. 4A, in step 1, it is assumed that application 121 is migrated from secure workspace 120-1 to secure workspace 120-5. This migration could be performed for any reason. For example, secure workspace 120-1 could be a Docker container and secure workspace 120-5 could be a virtual machine and the migration could be performed to enhance the security for application 121.

In step 2a, host agent 131 interfaces with the instance of workspace agent 133 running in secure workspace 120-5 to obtain the application ID and name of application 121. In step 2b, host agent 131 can provide the identifier for secure workspace 120-5 (SWID5), the identifier for application 121 (AppID1), and the name of application 121 to secure workspace display manager 132.

Turning to FIG. 4B, in step 3, secure workspace display manager 132 can update secure workspace data structure 202 to reflect that application 121 has been migrated to secure workspace 120-5. For example, secure workspace display manager 132 could determine that secure workspace data structure 202 already includes an entry for AppID1 but with a different secure workspace ID. Secure workspace display manager 132 may then update the entry to include the new secure workspace ID (or replace the entry).

Turning to FIG. 4C, in step 4, secure workspace display manager 132 can identify the existing mapping of application 121 to display 125-2 in application-to-display mappings data structure 203 and cause application 121's window to be moved to display 125-2. For example, secure workspace display manager 132 could use the identifier of secure workspace 120-5 to identify the window for application 121 and could then interface with OS APIs 115 to move the window to display 125-2.

If a display is connected to or disconnected from user computing device 100, secure workspace display manager 132 can detect this and update display data structure 201 accordingly. Then, secure workspace display manager 132 can determine any new or revised application-to-display mappings that should be created and store them in application-to-display mappings data structure 203. For example, if a new display is connected and application 122 is best suited for the new display, secure workspace display manager 132 could update the existing application-to-display mapping for application 122 accordingly and then move application 122's window to the new display. As another example, if display 125-1 is disconnected, secure workspace display manager 132 could determine which of display 125-2 or display 125-3 is best suited for application 122. Secure workspace display manager 132 could then update the application-to-display mapping for application 122 accordingly, and possibly update other application-to-display mapping(s) and move application 122's window based on the updated mapping.

In some embodiments, application-to-display mappings data structure 203 can be persisted across reboots so that secure workspace display manager 132 can again use the mappings without having to recreate them. In some embodiments, secure workspace display manager 132 may provide the user with the option of manually defining an application-to-display mapping to thereby override an existing application-to-display mapping.

In the above examples, it has been assumed that there are fewer applications than available displays. However, in many cases, there may be more applications than available displays and/or there may be more than one application that is best associated with the same display. In such cases, secure workspace display manager 132 may prioritize one application over another when determining with which display each application should be associated and/or could split windows on a display. In other words, secure workspace display manager 132 need not rely on static associations of application type and display characteristics but may consider the current set of applications relative to the current set of displays and then define the application-to-display mappings to optimize the multi-display environment for the given set of applications.

The above-described functionality can also be performed when multiple applications are hosted in the same secure workspace. For example, host agent 131 can communicate with workspace agent 133 to determine to which application each window of a secure workspace pertains. Secure workspace display manager 132 can then arrange these windows based on the application-to-display mappings as described.

By implementing this adaptive display association and placement for applications hosted in secure workspaces, embodiments of the present invention can maximize the user experience while using a multi-display environment. Embodiments of the present invention can adaptively and dynamically move windows to the best suited display even when these windows pertain to a secure workspace in which an application is hosted.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for adaptive display and placement for secure workspaces in a multi-display environment, the method comprising:
    identifying, by a secure workspace display manager, displays that are available to a user computing device;
    detecting, by a host agent executing on the user computing device, that secure workspaces are deployed on the user computing device;
    identifying, by the host agent, applications that are hosted in the secure workspaces deployed on the user computing device, each of the secure workspaces being a virtual machine or a software-based container that is deployed on the user computing device to isolate the respective application from an environment of the user computing device that is external to the respective secure workspace, wherein the host agent is executed in the environment that is external to the secure workspaces, wherein identifying the applications comprises interfacing with an instance of a workspace agent hosted in each of the secure workspaces;
    creating application-to-secure workspace mappings that associate the applications with the respective secure workspaces in which the applications are hosted;
    creating application-to-display mappings for the applications that are hosted in the secure workspaces;
    identifying, using the application-to-secure workspace mappings, windows pertaining to the secure workspaces in which the applications are hosted; and
    positioning the windows on the displays based on the application-to-display mappings.

2. The method of claim 1, wherein identifying the displays comprises identifying characteristics of the displays.

3. The method of claim 2, wherein the characteristics of the displays comprise one or more of: a screen size, a resolution, a refresh rate, color support, contract ratio, an orientation, pixel pitch, brightness, a position, or devices associated with the display.

4. The method of claim 1, wherein identifying the applications comprises obtaining one or both of an identifier or a name of each application.

5. The method of claim 1, wherein identifying the applications includes determining an application type for each application.

6. The method of claim 1, wherein the application-to-display mappings comprise mappings between identifiers of the applications and identifiers of the displays.

7. The method of claim 1, wherein creating the application-to-display mappings comprises selecting, for each application, a display that is best suited for the application based on an application type of the application and characteristics of the display.

8. The method of claim 1, further comprising:
    detecting that a first application of the applications has been migrated to a different secure workspace;
    determining that the application-to-display mappings map the first application to a first display; and
    positioning a window pertaining to the different secure workspace in which the application is presented to the first display.

9. The method of claim 1, further comprising:
    detecting that a first display of the displays has been disconnected;
    updating the application-to-display mappings; and
    positioning the windows on the displays based on the updated application-to-display mappings.

10. The method of claim 1, further comprising:
    detecting that a new display has been connected to the user computing device;
    updating the application-to-display mappings; and
    positioning the windows on the displays based on the updated application-to-display mappings.

11. The method of claim 1, further comprising:
    detecting that a new application has been launched in a new secure workspace;
    updating the application-to-display mappings; and
    positioning the windows and a new window pertaining to the new secure workspace in which the new application is presented on the displays based on the updated application-to-display mappings.

12. One or more computer storage media storing computer executable instructions which when executed implement a method for adaptive display and placement for secure workspaces in a multi-display environment, the method comprising:
    identifying, by a secure workspace display manager, characteristics of displays that are available to a user computing device;
    detecting, by a host agent executing on the user computing device, that secure workspaces are deployed on the user computing device;
    identifying, by the host agent, applications that are hosted in secure workspaces on the user computing device, each of the secure workspaces being a virtual machine or a software-based container that is deployed on the user computing device to isolate the respective application from an environment of the user computing device that is external to the respective secure workspace, wherein the host agent is executed in the environment that is external to the secure workspaces, wherein identifying the applications comprises interfacing with an instance of a workspace agent hosted in each of the secure workspaces;

creating application-to-secure workspace mappings that associate the applications with the respective secure workspaces in which the applications are hosted;

creating application-to-display mappings for the applications that are hosted in the secure workspaces based on application types of the applications and the characteristics of the displays;

identifying, using the application-to-secure workspace mappings, windows pertaining to the secure workspaces in which the applications are hosted; and positioning the windows on the displays based on the application-to-display mappings.

13. The computer storage media of claim 12, wherein the method further comprises:

detecting that a first application of the applications has been migrated to a different secure workspace;

determining that the application-to-display mappings map the first application to a first display; and positioning a window pertaining to the different secure workspace in which the application is presented to the first display.

14. The computer storage media of claim 12, wherein the method further comprises:

detecting that a first display of the displays has been disconnected;

updating the application-to-display mappings; and positioning the windows on the displays based on the updated application-to-display mappings.

15. The computer storage media of claim 12, wherein the method further comprises:

detecting that a new display has been connected to the user computing device;

updating the application-to-display mappings; and positioning the windows on the displays based on the updated application-to-display mappings.

16. The computer storage media of claim 12, wherein the method further comprises:

detecting that a new application has been launched in a new secure workspace;

updating the application-to-display mappings; and positioning the windows and a new window pertaining to the new secure workspace in which the new application is presented on the displays based on the updated application-to-display mappings.

17. A user computing device comprising:

one or more processors; and computer storage media storing computer executable instructions which when executed implement a method for adaptive display and placement for secure workspaces in a multi-display environment, the method comprising:

identifying, by a secure workspace display manager, characteristics of displays;

detecting, by a host agent executing on the user computing device, that secure workspaces are deployed on the user computing device;

identifying, by the host agent, applications that are running inside the secure workspaces, each of the secure workspaces being a virtual machine or a software-based container that is deployed on the user computing device to isolate the respective application from an environment of the user computing device that is external to the respective secure workspace, wherein the host agent is executed in the environment that is external to the secure workspaces, wherein identifying the applications comprises interfacing with an instance of a workspace agent hosted in each of the secure workspaces;

creating application-to-secure workspace mappings that associate the applications with the respective secure workspaces in which the applications are hosted;

creating application-to-display mappings for the applications based on application types of the applications and the characteristics of the displays;

identifying, using the application-to-secure workspace mappings, windows pertaining to the secure workspaces in which the applications are hosted; and positioning the windows on the displays based on the application-to-display mappings.

18. The user computing device of claim 17, wherein the method further comprises:

persisting the application-to-display mappings;

subsequent to a reboot, positioning at least one window pertaining to at least one of the applications on at least one of the displays based on the application-to-display mappings.

19. The user computing device of claim 17, wherein identifying applications that are running inside secure workspaces comprises interfacing with an instance of a workspace agent running inside each of the secure workspaces.

* * * * *